March 21, 1939.  K. C. NICHOLAS ET AL  2,151,436
SWEEP RAKE
Filed April 16, 1937  3 Sheets-Sheet 2
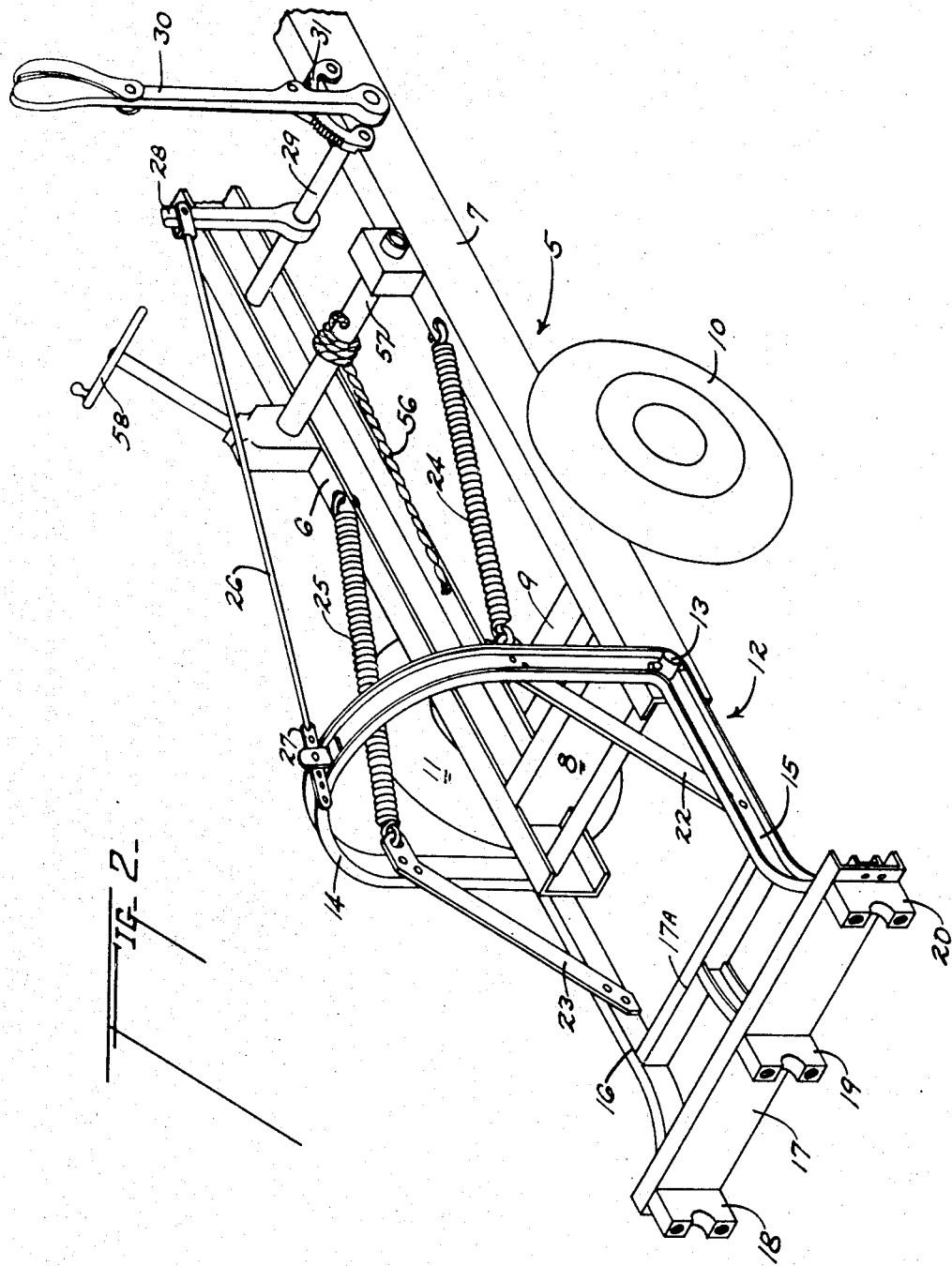
KERMIT C. NICHOLAS
DEMPSEY T. HODNETT
INVENTORS
BY Hubert Miller
ATTORNEY March 21, 1939.  K. C. NICHOLAS ET AL  2,151,436
SWEEP RAKE
Filed April 16, 1937    3 Sheets-Sheet 3
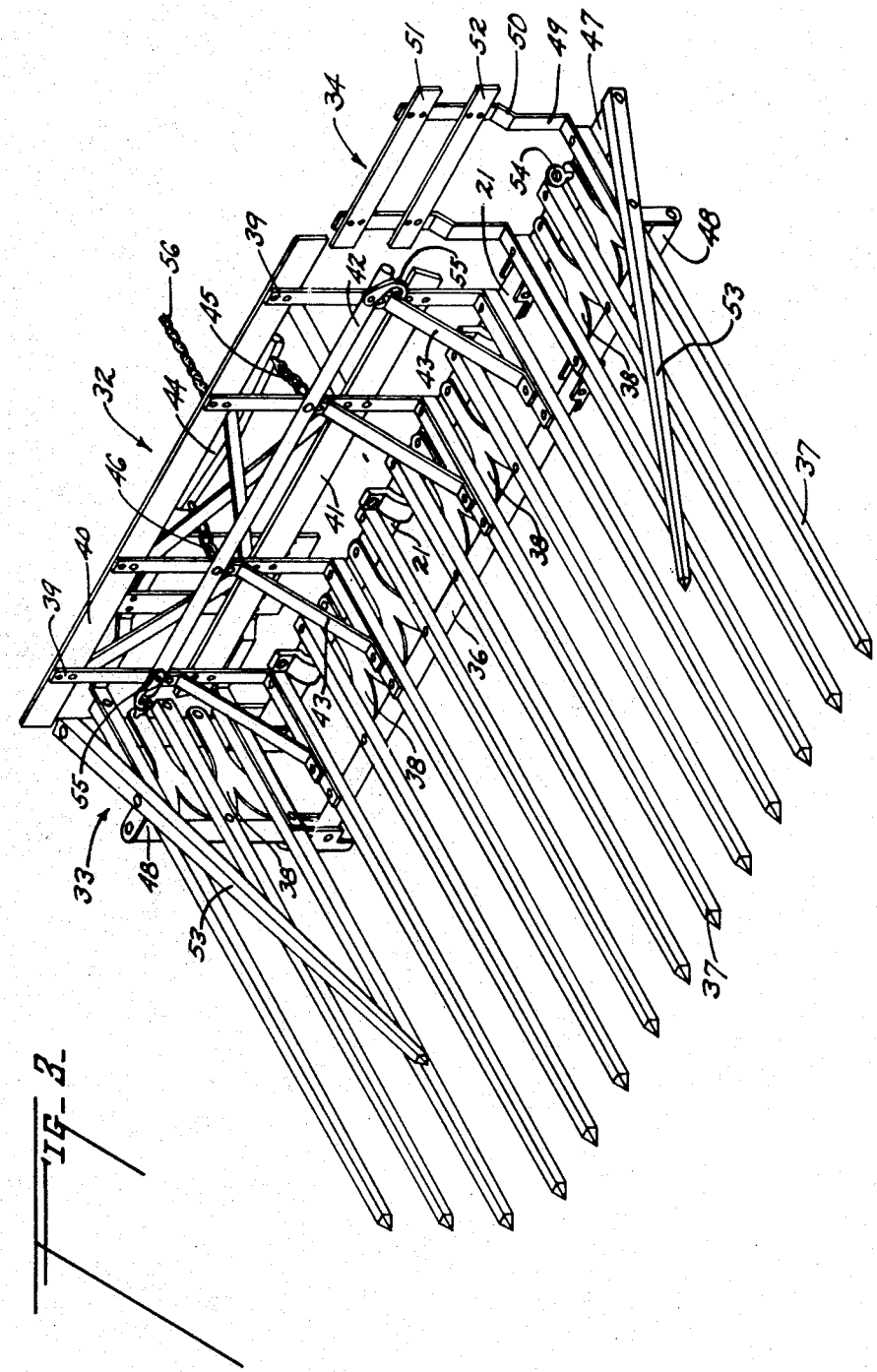
KERMIT C. NICHOLAS
DEMPSEY T. HODNETT
INVENTORS
BY Hubert Miller
ATTORNEY

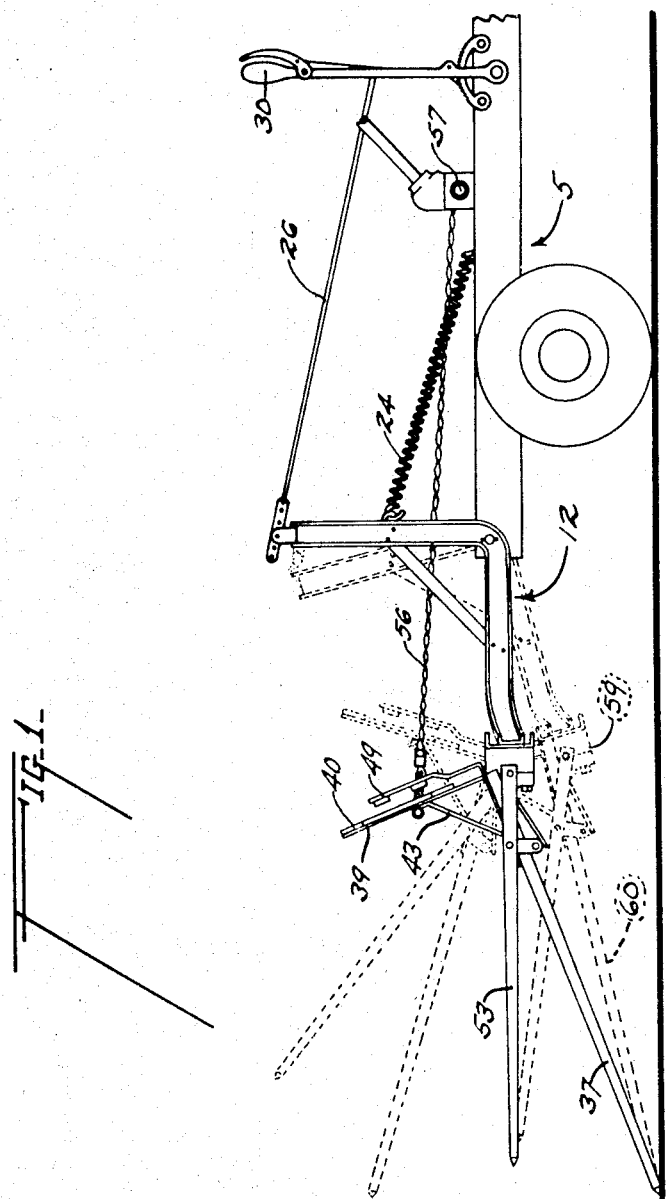

UNITED STATES PATENT OFFICE 2,151,436

SWEEP RAKE

Kermit C. Nicholas and Dempsey T. Hodnett, Chickasha, Okla.

Application April 16, 1937, Serial No. 137,170

6 Claims. (Cl. 56—397)

This invention relates to new and useful improvements in apparatus of the class commonly known as sweep rakes or bull rakes.

More particularly, the invention is concerned with the provision of a rake which is tiltable to a considerable angle with relation to the ground over which it travels, and which is susceptible of being reduced in overall width without the necessity of disassembling it, thereby to permit its travel on highways, through narrow gates, etc.

Wet hay in the field clings tenaciously to the ground and is very hard to pick up. The usual rake has the tip ends of its teeth upturned slightly to prevent the teeth from sticking into the ground. Since the angle of the teeth with relation to the ground cannot be increased, a considerable quantity of the wet hay passes under the tips of the teeth and is left in the field.

The chief object of providing a rake which is tiltable to a high angle, then, is to obviate the above difficulty by permitting the upturned tips of the teeth to travel closer to the ground traversed, and thus to pick up a maximum quantity of hay by traversing the ground only once, regardless of the condition of the hay or the condition of the ground.

Another object is to provide a rake which is formed in sections, the outside sections of which are foldable to an upright position to reduce the overall width and facilitate its passage through comparatively narrow openings.

Other objects of the invention will be fully understood from a consideration of the following detailed description when read in connection with the accompanying drawings which form a part of this application. The drawings are to be considered illustrative and not restrictive.

Referring to the drawings:

Figure 1 is a side elevation of the invention showing particularly various positions to which the rake may be adjusted;

Figure 2 is a perspective view of a portion of the wheeled supporting structure with the rake support mounted thereon; and, Figure 3 is a perspective view of the rake proper, showing one of its side sections in folded position.

Like characters of reference designate like parts in all the figures.

Wheeled supporting structure

The wheeled supporting structure of the apparatus herein disclosed comprising a frame designated generally by the numeral 5 (Figs. 1 and 2), which frame includes two side members 6 and 7, and the usual cross braces 8. The front end of the frame is mounted on an axle 9 on which are mounted two wheels 10 and 11. The frame members 6 and 7 project forwardly beyond the axle and the wheels. This structure will hereinafter be referred to as the truck. The rear end of the truck has not been shown and is immaterial to the operation of the device. It is presupposed that there will be at least two additional wheels on the truck and that preferably it will be supplied with a power unit. The truck may be a specially designed unit or may be a tractor of any type. In case a tractor is used in connection with our invention, and its forward end is not properly formed, projecting extensions may be welded or otherwise secured to the front end of the tractor to take the place of the forward ends of the frame members 6 and 7, to carry the rake, as hereinafter described.

Rake lift and support

The rake support, designated as a whole by the numeral 12, is substantially a bell crank pivotally mounted on the front end of the truck by means of a shaft 13 which is suitably journaled in the forward ends of the frame members 6 and 7. The support has a hoop portion 14 and two integral channel members 15 and 16 which are parallel to each other and extend at right angles to the hoop portion 14. Their outer ends curve outwardly away from each other and carry cross braces 17 and 17A which may be welded or riveted to said channel members 15 and 16. The cross brace 17 in turn carries a plurality of bearing blocks 18, 19 and 20 which serve to journal the axle 21, which is a portion of the rake proper (Fig. 3). Angle braces 22 and 23 are suitably connected to the channel members 15 and 16 respectively and to the hoop member 14 near its upper end. The upper ends of these braces are perforated to receive the ends of springs 24 and 25 respectively, the other ends of which are hooked through perforations in the frame members 7 and 6 respectively. These springs, when the support 12 is in its normal operative position, are slightly sprung and serve to partially support the weight which is carried by the forward end of the support 12, and to make the lifting of the weight less difficult.

As a means of lifting the weight carried by the forward end of the rake support 12, pipe or rod 26 is secured to the upper end of the rake support at 27 and its other end is secured to an arm 28, which in turn is rigidly secured to a cross shaft 29 which is suitably journaled on the track 5, and to which may be secured an operating handle 30, which serves to raise or lower the forward end of the rake support by pivoting the entire support about its axis 13. A ratchet 31 may be used in connection with the handle 30 for selectively positioning the rake support 12 in any desired position with relation to the truck. It will be understood that the shaft 29 may be journaled at any desired point on the truck and that if preferred, an arm similar to the arm 28 may be mounted on the outer end of the shaft 29 in place of the handle 30, and the handle may be located near the rear end of the truck with a suitable means connecting the handle and the arm.

*The rake proper (Fig. 3)*

The rake proper includes a central section and two side sections which are designated respectively by the numerals 32, 33 and 34. The central section comprises an axle 21, a cross brace 36 parallel to the axle and lying in the same horizontal plane, and a plurality of spaced teeth 37 which are preferably formed of wood and which are bolted or otherwise secured to the axle and to the cross member as shown. A plurality of Y-braces 38 are welded or otherwise rigidly secured to the axle and to the cross member 36 and serve to prevent any possible relative side sway between the cross brace 36 and the axle 35.

At the rear end of the center section 32 is an upright back member comprising a plurality of angle braces 39, one portion of which is bolted or otherwise secured to the teeth 37, near their rear ends as shown, and the other portion of which extends at right angles to the teeth upward. Cross members 40 and 41 are attached to the upright portions of the braces 39, and a cross brace 42 is also rigidly secured to each of the upright members 39 between the two cross members 40 and 41. A plurality of angle braces 43 have their opposite ends secured to the braces 39, and serve to add strength and rigidity to the upright portion of the center section. A singletree 44 is secured to the center section by means of chains 45 and 46, the loose ends of which are attached to two of the braces 39. Naturally the point of attachment of this singletree to the section 32 is midway between the sides of the section.

The axle 21 of the center section is adapted to be journaled in the bearing blocks 18, 19 and 20 of the rake support (Fig. 2). In the drawings the outer halves of the bearing blocks 18, 19 and 20 have been shown in their proper positions on the axle 21 (Fig. 3). These outer halves of the bearing blocks are, of course, suitably secured to the mounted halves by means of bolts. This manner of mounting affords a pivotal movement for the rake.

The center section 32 of the rake, as previously mentioned, carries two side sections 33 and 34 which are hinged thereto, and which may be folded upward from their horizontal positions to a position substantially at right angles thereto as shown in Fig. 3, section 33. The main structure of these side sections is substantially similar to the construction of the center section. Each side section has a short stub axle 47, a cross brace 48, teeth 37, Y-braces 38 and upright back members supported by angle braces 49, the upwardly extending portion of which is offset, as shown at 50, to permit the back members to pass behind the back member of the center section 32 when the side sections 33 are folded upward as previously described. The back member of each side section also includes two cross members 51 and 52, an upwardly extending tooth 53, and a suitable hasp 54 which serves to maintain the side sections in their folded positions by cooperating with hooks 55 carried by the center section as shown.

Each side section is connected to the center section by means of hinged joints at the adjacent ends of the axles 21 and 47, as well as hinged joints at the adjacent ends of the cross braces 36 and 48. These hinged joints are so constructed that the side sections, when in operating position, lie in substantially the same plane as the center section.

As a means of pivoting the rake about its axis 21, a rope, chain or suitable member 56 has one of its ends secured to the singletree 44, and has its other end connected to the drum 57 of a winch, which drum is suitably journaled on the truck 5. The winch may be hand operated by an operating wheel 58 as shown, or if desired may be power operated.

*Operation*

Figure 1 of the drawings more clearly illustrates the operation of our device. From the illustration it will be seen that if it is desired to have the teeth 37 of the rake extend toward the ground at a very slight angle the rake support 12 may be pivoted so that its forward end moves toward the ground as shown by the dotted lines at point 59 by moving the handle 30 forward, which movement of the rake support 12 will stretch the springs 24 and 25 as previously described. The rake teeth will then be in the position designated by the dotted lines at point 60. After a sufficient quantity of hay has been collected on the teeth of the rake the winch drum 57 is operated which pivots the rake proper about its axis 21 raising the forward ends of the teeth away from the ground. With the rake in this position the hay may be transported to any desired point, the winch again operated to lower the forward ends of the teeth, and if it is necessary in order to free the rake of its load of hay, the handle 30 may be pushed forward tilting the rake support 12 and lowering the rear end of the rake, thus making it possible to slide the rake out from under the load of hay.

When it is desired to move the entire device together with its wheeled supporting structure 5 through a narrow gate or other narrow passageway, the side sections 33 and 34 may be folded upward as shown in Fig. 3, hooked in position, the upper ends of the teeth raised, and the vehicle is then in condition to be moved.

From the above description it will be seen that we have invented a device which, because of the means we have provided for tilting the rake teeth to various angles with relation to the ground, is extremely flexible in operation; which is efficient in operation whether the hay is wet or dry; and which may be moved from place to place without the necessity of disassembling it.

While we have described and illustrated a specific embodiment of the invention we are aware that numerous alterations and changes may be made in the details of construction and we do not wish to be limited except by the prior art and the scope of the appended claims.

We claim:

1. A device of the class described comprising: a toothed rake; a wheeled structure for supporting and transporting said rake; a frame-like link substantially the equivalent of a bell crank pivotally mounted at one end of said wheeled structure; a transversely disposed axle forming a portion of the rear end of said rake and pivotally carried by one free end of said link; means connected to the other free end of said link and operable from the wheeled structure for moving said link about its axis and for selectively positioning it with relation to said wheeled structure; and independent means for tilting said rake about its axis and for selectively positioning it with relation to said link and said wheeled structure.

2. In a sweep rake, a carriage comprising transverse supporting axles having suitable wheels thereon; a rake support in the form of a bell crank pivotally mounted at one end of said carriage; a combination rake and hay cradle having a transverse axle at its rear end, said axle being pivotally carried by one free end of said bell crank rake support; means connected to the other free end of said rake support for positively positioning said rake support in any desired position with relation to its axis and to said carriage; and means for positively positioning said rake in any desired position with relation to its axis, to the rake support, and to the ground.

3. A device of the character described comprising: a combination toothed rake and hay cradle having a transverse axle rigidly carried at its rear end; a bell crank supporting frame pivotally mounted on a mobile carriage, one free end of the frame journaling said transverse crade axle; means connected to the other free end of the frame for selectively positioning said supporting frame with relation to said carriage; and means for selectively positioning said rake with relation to said bell crank supporting frame.

4. In a device of the class described, a rake adapted to have its rear end pivotally mounted on a supporting structure, and comprising a central section having a plurality of parallel longitudinally extending teeth and an upright framework back rigidly positioned with relation to said teeth near their rear ends; two side sections of lesser width than said central section, one hinged to each side thereof, adapted to normally lie in the same plane therewith, or to be folded upwardly and inwardly at an angle thereto, and each having a lesser plurality of parallel longitudinally extending teeth and an upright framework back rigidly positioned with relation to said teeth near their rear ends, and lying outside the plane in which the back of said central section lies.

5. In a device of the class described, a rake adapted to have its rear end pivotally mounted on a supporting structure, and comprising a central section having a plurality of parallel longitudinally extending teeth and an upright framework back rigidly positioned with relation to said teeth near their rear ends; two side sections of lesser width than said central section, one hinged to each side thereof, adapted to normally lie in the same plane therewith, or to be folded upwardly and inwardly at an angle thereto, and each having a lesser plurality of parallel longitudinally extending teeth and an upright framework back rigidly positioned with relation to said teeth near their rear ends, and lying outside the plane in which the back of said central section lies; and means for maintaining said side sections in their folded position with relation to said central section.

6. A device of the class described comprising: a wheeled main supporting structure; a bell crank supporting frame pivotally mounted thereon; a sectionally constructed toothed rake having its rear end pivotally secured to one free end of said supporting frame, the sections of said rake normally lying in the same plane, the outermost sections being hinged to a central section and adapted to be folded upwardly and inwardly with relation thereto, thereby to decrease the overall width of the rake; means connected to the rake and operable from the wheeled structure for controlling the pivotal movement of said rake with relation to the frame; and means connected to the other free end of said supporting frame and operable from said wheeled structure for controlling the pivotal movement of said frame with relation to said supporting structure.

KERMIT C. NICHOLAS.
DEMPSEY T. HODNETT.